May 7, 1940.  G. E. PRICE  2,199,650

HEATER UNIT

Filed Sept. 3, 1937  2 Sheets-Sheet 1

WITNESSES:
C. J. Weller.

INVENTOR
George E. Price.
BY
W. R. Coley
ATTORNEY

May 7, 1940.     G. E. PRICE     2,199,650
HEATER UNIT
Filed Sept. 3, 1937     2 Sheets-Sheet 2
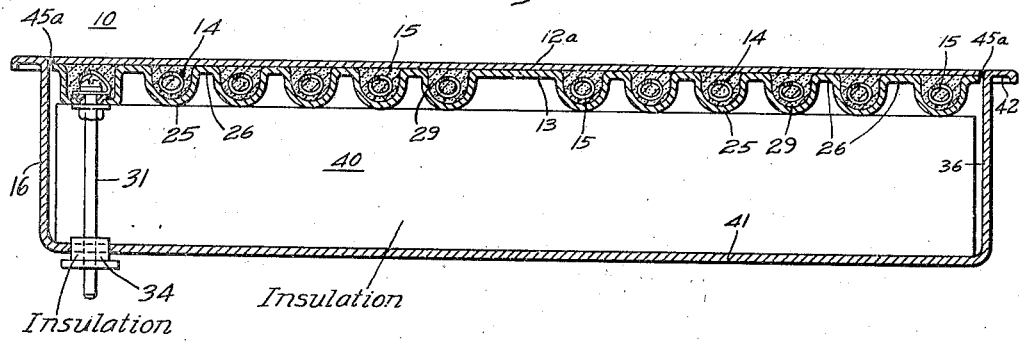
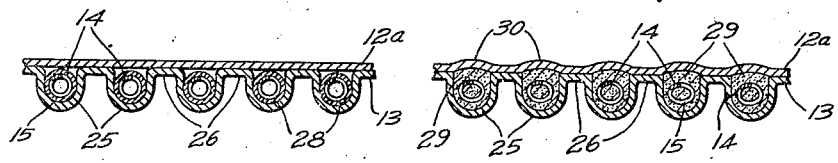
WITNESSES:
C. J. Weller.
H. G. Hepler.
INVENTOR
George E. Price.
BY
W. R. Coley
ATTORNEY Patented May 7, 1940

2,199,650

UNITED STATES PATENT OFFICE 2,199,650

HEATER UNIT

George E. Price, Mansfield, Ohio, assignor to Westinghouse Electric & Manufacturing Company, East Pittsburgh, Pa., a corporation of Pennsylvania Application September 3, 1937, Serial No. 162,236

6 Claims. (Cl. 219—37)

My invention relates to heater units and more particularly to totally enclosed surface heater units for ranges.

In those surface heater units known to the art in which the heating element has been embedded within an insulating material, such as magnesium oxide, the degree of heat conductivity from the heating element to the top-plate has been relatively low due to the insulating material not being sufficiently compact. It is, therefore, an object of my invention to provide a range surface heating unit having an insulating material between the heating element and the top-plate thereof which will have such a density or compactness as to increase the heat conductivity between such heating element and the top-plate.

A further object of my invention is to provide a rugged, inexpensive heating unit easily manufactured and having a high operating efficiency.

A further object of my invention is to provide a range surface heating unit which is capable of transferring a maximum amount of heat from the top-plate thereof to a vessel placed thereon either by conduction or radiation.

Other objects of my invention will either be pointed out specifically in the course of the following description of a device embodying my invention or will be apparent from such description.

In the accompanying drawings:

Fig. 3 is a sectional view of a modified form of the device shown in Fig. 1; and Fig. 4 illustrates one step and Fig. 5 a second step in the manufacture of the device shown in Fig. 3.

Figure 1:
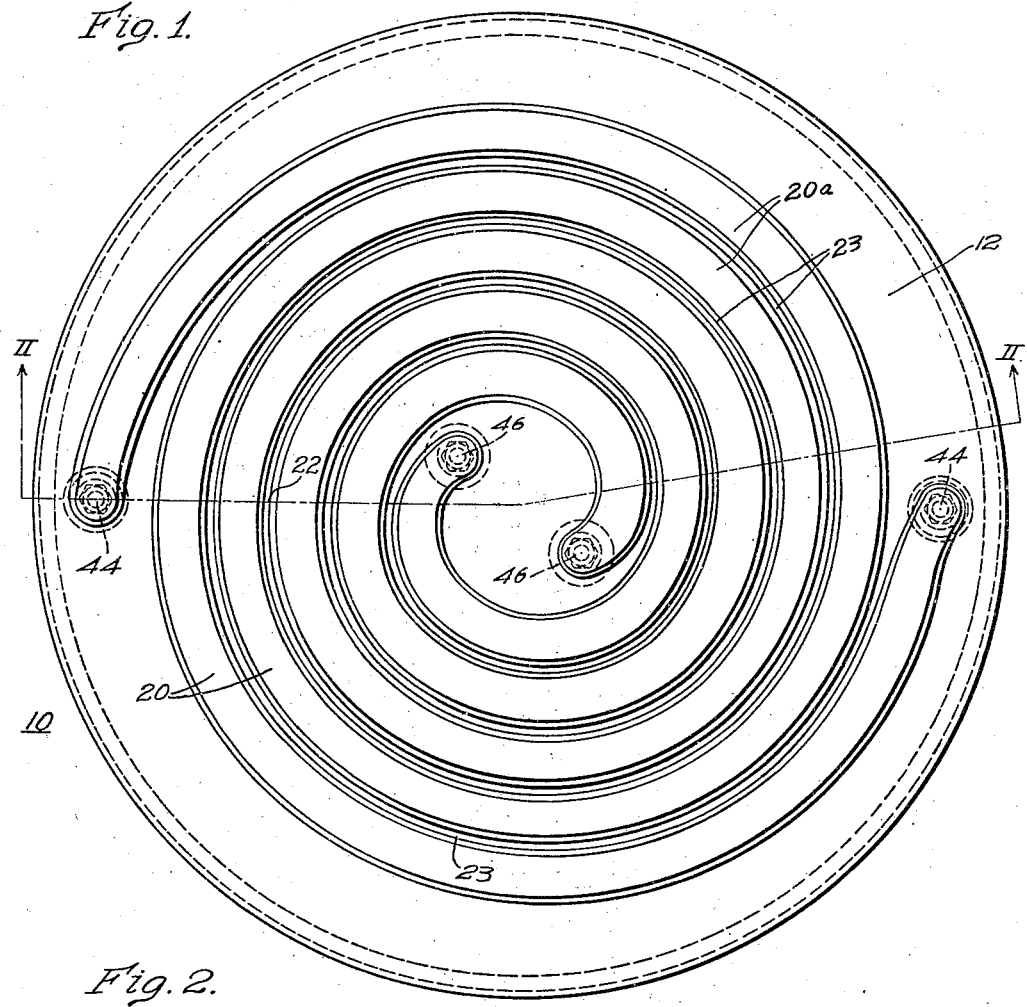
Figure 1 is a plan view of a device embodying my invention.

Referring to the accompanying drawings, I show a range surface unit 10, comprising a heating unit including oppositely disposed sheet metal plates 12 and 13, having spaced curved passages or convolutions 14 therebetween, a heating element 15 operatively and insulatedly disposed within the passages between said metal plates, and a housing 16 which supports the heating unit 10.

The top metal plate 12 of the heating unit 10 may comprise a plurality of embossed or raised portions 20 separated by bridging portions 23. The embossed portions 20 have a large flat contact surface 20a, which is spaced a relatively short vertical distance 21 above the bridging portions 23. The horizontal distance 22 between the flattened surfaces 20a of the embossed portions 20 is likewise maintained at a relatively short distance in relation to the distance across the flattened surface of the embossed portions 20. It is, therefore, apparent that the open space located between the embossed portions 20 will be substantially a narrow V-shaped groove which, after a vessel has been placed upon the heating unit, will contain a relatively small volume of air.

Figure 2:
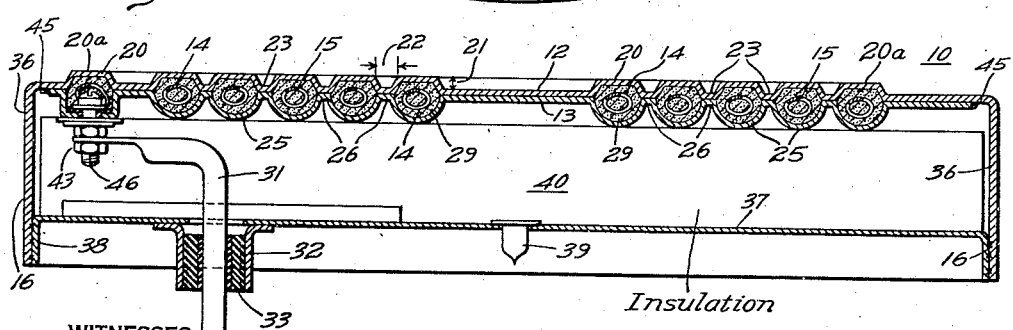
Fig. 2 is a sectional view taken along line II—II of Fig. 1.

By having the flattened contact surface 20a of the embossed portions 20 large with relation to the substantially V-shaped space between such embossed portions, as shown in Fig. 2, the heat transfer from the flattened contact surface and through the air in the V-shaped air space to any suitable vessel placed thereon by conduction and radiation will be substantially a maximum value.

The bottom plate 13 of the heating unit 10 has a plurality of embossed portions 25 separated by bridging portions 26. The embossed portions 25 cooperate with the embossed portions 20 of the top-plate 12 by being located opposite thereto and may be of any size or shape desired. However, it is preferred that they be semi-circular in cross-section and have a radius of curvature large enough so that such embossed portion will adequately support the heating element 15 and a suitable insulating material therefor, such as magnesium oxide. The bottom plate 13 may be attached to the top-plate in any suitable manner, preferably by spot welding, so that the cooperating embossed portion 20 and 25 will form the spaced passages 14.

The heating element 15 may comprise a helical resistance wire and may be located within the spaced passages or convolutions 14 and insulated therefrom in any suitable manner. However, it is preferred that the heating element 15 be insulated from the spaced passages 14 by means of magnesium oxide, which is formed by a magnesium ribbon disposed within and without the resistance wire and processing the magnesium in a manner well known to the art, as hereinafter described.

The housing 16 comprises a side portion 36 and either a separate bottom portion 37, as shown in Fig. 2, or an integral bottom portion 41, as shown in Fig. 3. When it is desired to use the separate bottom portion 37, the side portions 36 may be an integral part of the top-plate 12, as shown in Fig. 2. By having the side portions 36 a part of the top-plate 12, the removable bottom portion 37 may then be inserted within the side portion 36 and attached thereto in any suitable manner, such as by spot welding. Should the housing 16 be separate from the top-plate 12a, the housing may be in the form of a dish having vertical side portions 36 and an integral bottom 41, as shown in Fig. 3. With such a housing and if it be desired to rigidly attach the heating unit 10 to the housing, the top-plate 12a may extend over the shoulder 42 of the side portion 36 of housing 16 and may be welded thereto.

An insulating block 40 may be located within the housing 16 intermediate the bottom plate 13 of the heater unit and the bottom portion 37 or 41 to thermally insulate the heating unit from below. However, the surface unit 10 may be assembled without an insulating block 40, and the top surface of the bottom plates 37 or 41 may have a polished surface to reflect upwardly any heat which might be radiated downwardly from the heating unit 10.

Suitable inleads 31 may be insulated inserted within the housing 16 and may be attached to the heating element 15 by means of bolts 46 and nuts 43 or in any other desirable manner. The inleads 31 may be insulatedly mounted upon the bottom portions 37 or 41 by means of a collar 32 rigidly attached to said bottom portion and a suitable insulating tube 33 located therein, as shown in Fig. 2. The inleads 31 may likewise be insulatedly attached to the bottom portion 37 or 41 by means of an insulating grommet 34 as shown in Fig. 3.

The insulating material 29 located within the spaced passages 14 may be formed by covering the heating element 15 with a magnesium ribbon 28 and then after the top-plate and the bottom plate have been rigidly attached together, such top-plate may be subjected to sufficient heat to cause the magnesium ribbon 28 to be transformed from a metallic state into magnesium hydroxide. The heat may be supplied to the heating unit 11 by placing such unit within an autoclave full of water heated to 600° F. and by increasing the pressure in the autoclave to approximately 750 to 1000 pounds. Due to the increased volume accompanying this transformation from a metal to magnesium hydroxide, a tremendous force will be exerted upon the walls of the spaced passages 14 which will tend to compact the magnesium hydroxide and cause the top-plate 12a to bulge, as shown in Fig. 5. Moreover, it is to be understood that the embossed portions 25 and 20 of the bottom and of the top-plate may likewise become slightly distorted by the action of the magnesium hydroxide.

The unit may then be heated by the passage of current through the heating element or by any other suitable method. As the heating unit increases in temperature the magnesium hydroxide will be dried and changed into magnesium oxide. The magnesium oxide, due to its close relation or affinity for the heating element 15 and the walls of the spaced passages 14, will provide an excellent compressed electrical-insulating material and conductor of heat between the heating element 15 and the walls of the spaced passages 14. A sufficient pressure may then be applied to said plates to force the bulged portions, such as 30 shown in Fig. 5, back to their original flat position as shown in Fig. 3, or the bulged embossed portions 20 and 25 back to their original shape, as shown in Fig. 2. During the application of pressure upon the plates the magnesium oxide will be further compressed and will become denser, which increases the heat conductivity of such insulating material and lengthens the life of the surface unit.

Before forming the insulating material 29 for the device, as shown in Fig. 2, the embossed portions 20 of the top-plate 12 may be in substantially an oval shape similar to that of the embossed portions 25 of the bottom plate 13, with the heating element 15 therebetween. The metallic magnesium 28 placed about the heating element 15 will, upon the application of sufficient heat, be transformed to fill the entire passage 14 with magnesium oxide, as hereinabove described. A sufficient pressure may then be applied to the plates 12 and 13 to deform the embossed portion 20 and place thereon the flat top surface 20a, and simultaneously further compressing the magnesium oxide 29, causing such material to become very dense.

It is preferred, that, when making a flat top-plate 12, such top-plate may have a plurality of small embossed portions 30, substantially as shown in Fig. 5, located in a position to cooperate with the embossed portions 25 of the bottom plate 13. The magnesium metal 28 then upon oxidizing into magnesium hydroxide 29, will expand and fill the entire spaced passages 14. The plates may then have applied thereto sufficient heat and pressure to cause the magnesium hydroxide to change to magnesium oxide, and to force the small embossed portions 30 to return to their normal position leaving the top-plate substantially flat, as shown in Fig. 3. By using an originally deformed top-plate 12 and then pressing it out flat, as hereinabove described, the magnesium oxide will be forced into a more dense, compact mass than if the top-plate were deformed by the action of the formation of the magnesium hydroxide 29.

In assembling the device embodying my invention, as shown in Fig. 2, the top-plate 12 and the integral side portions 36 of the housing 16 may be placed over the bottom plate 13 with the heating element 15 and the magnesium metal 28 wound thereabout located within the spaced passages 14. The top-plate 12 and the bottom plate 13 may then be rigidly attached together by spot welding the bridging portions 23 and 26 together at several separate places. The number of these spot welds is not sufficient to completely seal the spaced passages 14. Then, upon the application of sufficient heat as described, the magnesium metal 28 wound about the heating element 15 will be transformed first into magnesium hydroxide and then into the magnesium oxide insulating material 29. Pressure may then be applied to the plates 12 and 13 through suitable dies and the flat surfaces 20a may be formed upon the embossed portion 20, which, in turn, will increase the density of the insulating material 29 as hereinabove described.

While pressure is being applied to the plates 12 and 13 an additional number of spot welds may be applied to the bridging portions 23 and 26 to more firmly secure the plates together so that they will resist the expansive thrust of the compressed electric-insulating material 29 and will prevent deformation of the heating plate as it is heated to red heat in the air. At the same time the edges of the plates may be welded together or otherwise sealed throughout the whole circumference as shown at 45 in Fig. 2 and at 45a in Fig. 3. This may be done in any desired manner to ensure that the magnesium shall be completely protected from the outside atmosphere, and to permit the heating unit to be hermetically sealed.

The inlead 31 may then be rigidly attached to the stud bolt 46, operatively associated with one end of the heating element 15, by means of nuts 43. The suitable insulating material 40 may then be located within the housing 16, if desired, and the removable bottom 37 may be placed within the housing 16 and rigidly attached thereto in any suitable manner preferably a continuous weld at the juncture 38, as shown in Fig. 2.

If it be preferred to have the housing 16 hermetically sealed, the removable bottom 37 should have a gas-tight juncture with the housing 16, as shown at 38 in Fig. 2, and the top-plate 12a should have a gas-tight juncture with the housing, as shown at 46a in Fig. 3. An evacuating-sealing tube 39 may be then operatively associated with the bottom 37 and may be rigidly attached thereto in any suitable manner which will be capable of forming a glass-to-metal air-tight seal. The inleads 31 must likewise be sealed within the housing 16 by means of the collar 32 and insulating tube 33 as hereinabove described.

If it be desired to have a flat surface top-plate, as shown in Fig. 3, the top-plate 12 may be a small circular plate as shown, or may be in the form of a dish substantially as shown in Fig. 2. However, if it be preferred to have the top plate in the form of a small disc and have the housing 16 in the form of a dish substantially as shown in Fig. 3, the heating unit 10 may be hermetically sealed therein by having the top-plate 12 extend beyond and upon the shoulders 42 of the housing 16 where they may be welded to such shoulders to form a gas-tight seal thereto. With such a structure, if it be desired to hermetically seal the heating unit, it becomes necessary to have a glass-to-metal seal 39, substantially as shown in Fig. 2, preferably located within the bottom plate 41.

The top-plate of the heating unit will arrive at a red heat in air within a few seconds after the heating unit has been connected to a power supply, not shown, and will not buckle with continued operations thereof.

The top-plate having a relatively large contact surface will operate at a higher efficiency than those units now known to the art in which the embossed portions are substantially circular in shape, since the efficiency of heat transfer is greatest with direct conduction and by radiation through a small volume of air which is at a high temperature. It is, therefore, obvious that by using a surface unit as embodied in my invention, the top-plate, which has a relatively large contact surface in contact with a vessel which may be located thereon, will due to the large contact area between the vessel and the heating unit operate at a high degree of efficiency, and moreover, the material in the vessel will quickly reach its maximum temperature.

It is to be understood that, if it be desired to have the embossed portions located upon the top-plate, as shown in Fig. 2, the open space between the spaced passages 14 must be maintained small in proportion to the contact surface of such embossed portion. By having this area a minimum value in proportion to the area of the contact surface, as hereinabove described, the air located therein will, after increasing to its maximum temperature, readily conduct the heat from the sides of the embossed portions 20 and the bridging portions 23 to a vessel located upon the surface unit with a maximum efficiency. The temperature of the air located between the embossed portions can only be maintained at a high temperature if the volume of such air remains small in relation to the surface thereabout, and it is to be understood that the higher the temperature of the air within the groove the greater will be the efficiency of radiation of heat therethrough.

It is, therefore, obvious that by using a surface unit as embodied in my invention, in which the top-plate is substantially flat or has flat topped embossed portions separated by V-shaped air spaces, such surface heater unit will be capable of transferring a maximum amount of heat from the top-plate to a vessel placed thereon, either by conduction or radiation.

Various further modifications may be made in the device embodying my invention without departing from the spirit and scope thereof, and I desire, therefore, that only such limitations shall be placed thereon as are imposed by the prior art and the appended claims.

I claim as my invention:

1. A totally enclosed electric heating unit comprising a housing, a pair of metal plates in face-to-face position and having spaced passages therebetween including a top-plate having flat surfaced embossed portions and a bottom-plate having embossed portions therein, the walls of said spaced passages comprising said embossed portions, bridging portions separating said spaced passages, the horizontal distance between said spaced passages along said bridging portions and the vertical distance between the bridging portions and the flat-surface of the top-plate embossed portions being small in relation to the flat-surface of the top-plate embossed portions, and a heating element having a single turn mounted within each of the spaced passages, insulating material completely filling the space between said heating element and said plates, means comprising said housing for supporting and sealing the plates, insulating means located within said housing and below said metal plates, and means comprising said housing and insulating means for thermally insulating the bottom of said plates.

2. A totally enclosed electric heating unit comprising a housing, a pair of metal plates in face-to-face position and having spaced passages therebetween including a flat-surfaced top-plate and a bottom-plate having embossed portions therein, the walls of said spaced passages comprising said embossed portions, and a heating element having a single turn mounted within each of the spaced passages, insulating material completely filling the space between said heating element and said plates, means comprising said housing for supporting and sealing the plates, insulating means located within said housing and below said metal plates, and means comprising said housing and insulating means for thermally insulating the bottom of said plates.

3. The method of making an electric hot plate adapted to operate at red heat in air, which includes the steps of locating a heating element between an upper and a lower opposed metal plate having cooperating embossed portions therein, a single turn of said element being disposed in each of the spaces formed by said embossed portions, completely filling the space between said heating element and said plates with highly compressed heat-conducting electrically insulating material, and flattening the embossed portions in said upper plate to increase the density of said insulating material between the element and the upper plate to thereby increase its heat conductivity and lengthen the life of the hot plate the flattened embossed portions being located in a common plane.

4. The method of making an electric hot plate which includes the steps of placing initially metallic expansively oxidizable material in close relation to a heating coil, locating said coil between an upper and a lower opposed metal plate having cooperating embossed portions therein, a single turn of said coil being disposed in each of the spaces formed by said embossed portions, oxidizing said material to completely fill the space between said coil and said plates with highly compressed insulating material, permanently securing the plates together, and flattening the embossed portions in said upper plate to flatten said coil and increase the density and the thermal conductivity of said material between the coil and the upper plate, the flattened surfaces all being disposed in substantially the same plane to provide a relatively large surface for conduction of heat to a utensil adapted to be placed upon and in contact therewith.

5. An electric heating unit adapted to operate at a red heat in air and to directly support a cooking utensil on one surface thereof comprising a pair of metal plates arranged in face-to-face relation, said plates having cooperating embossed portions providing spaced passages therebetween, a resistor wire arranged in a plurality of spaced convolutions with only one convolution disposed in each passage, a continuous mass of highly compressed heat-conducting and electrical-insulating material entirely surrounding said wire and exerting an expansive force on said plates, means for securing said plates together to resist the expansive thrust of the material, the embossed portions of the upper plate being flattened under pressure applied thereto to more highly compress the material in a zone between the wire and the upper plate to increase the thermal conductivity of said zone and to provide a generally flat cooking surface.

6. In a heating unit as set forth in claim 5, a housing for supporting and sealing the plates, a mass of thermal insulating located within the housing and below said plates for insulating the bottom thereof.

GEORGE E. PRICE.